(12) United States Patent
Baba et al.

(10) Patent No.: US 9,958,937 B2
(45) Date of Patent: May 1, 2018

(54) DEVICE AND SYSTEM FOR VIEWING CONTENT USING HEAD-MOUNTED DISPLAY

(71) Applicant: COLOPL, Inc., Tokyo (JP)

(72) Inventors: Naruatsu Baba, Tokyo (JP); Takeshi Kobayashi, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days. days.

(21) Appl. No.: 15/376,883

(22) Filed: Dec. 13, 2016

(65) Prior Publication Data
US 2017/0090556 A1    Mar. 30, 2017

Related U.S. Application Data

(63) Continuation of application No. PCT/JP2016/053645, filed on Feb. 8, 2016.

(30) Foreign Application Priority Data

Feb. 12, 2015  (JP) ................................ 2015-025469
May 29, 2015  (JP) ................................ 2015-110102

(51) Int. Cl.
G09G 5/00       (2006.01)
G06F 3/01       (2006.01)
(Continued)

(52) U.S. Cl.
CPC .............. G06F 3/012 (2013.01); G09G 5/00 (2013.01); G09G 5/14 (2013.01);
(Continued)

(58) Field of Classification Search
CPC ......... H04N 21/4122; H04N 21/42222; H04N 21/4821; G06F 3/012; G09G 5/14; G09G 5/00
(Continued)

(56) References Cited

U.S. PATENT DOCUMENTS 5,977,935 A  *  11/1999  Yasukawa ............ G02B 27/017
                                                     340/980
6,161,932 A      12/2000  Goto et al.
(Continued)

FOREIGN PATENT DOCUMENTS

JP     10-240491 A    9/1998
JP     11-259226 A    9/1999
(Continued)

OTHER PUBLICATIONS

Office Action in JP Application No. 2015-025469, dated Feb. 26, 2016.
(Continued)

*Primary Examiner* — Trang U Tran
(74) *Attorney, Agent, or Firm* — Hauptman Ham, LLP

(57) ABSTRACT

Provided is a content viewing system using a head-mounted display (HMD), which enables a user to know a popular broadcaster content in real time. A device to be used for content viewing includes: a display unit configured to display, on the head-mounted display, a plurality of virtual displays arranged in a virtual space; a selecting unit configured to select one of the virtual displays based on movement detected by a detector of the head-mounted display; and a playing unit configured to play a content associated with a selected virtual display. The plurality of virtual displays are arrayed in grid sections provided along a celestial sphere surface. The selecting unit is configured to identify one of the grid sections on the celestial sphere surface based on the detected movement, to thereby select one virtual display associated with the identified grid section.

9 Claims, 17 Drawing Sheets

(51) Int. Cl.
- *G09G 5/14* (2006.01)
- *H04N 21/482* (2011.01)
- *H04N 21/422* (2011.01)
- *H04N 21/41* (2011.01)

(52) U.S. Cl.
CPC ... *H04N 21/4122* (2013.01); *H04N 21/42222* (2013.01); *H04N 21/4821* (2013.01)

(58) Field of Classification Search
USPC ............. 348/115, 113, 78; 345/8, 7, 9
See application file for complete search history.

(56) References Cited

U.S. PATENT DOCUMENTS

| | | | |
|---|---|---|---|
| 6,304,234 B1* | 10/2001 | Horiuchi | G02B 27/017 345/1.3 |
| 9,568,996 B2* | 2/2017 | Murata | G06F 3/012 |
| 2009/0109338 A1 | 4/2009 | Furutani | |
| 2010/0245585 A1* | 9/2010 | Fisher | H04M 1/6066 348/164 |
| 2011/0058102 A1 | 3/2011 | Nishimura | |
| 2015/0070389 A1* | 3/2015 | Goto | G06T 7/00 345/633 |

FOREIGN PATENT DOCUMENTS

| | | |
|---|---|---|
| JP | 2002-312117 A | 10/2002 |
| JP | 2008-33891 A | 2/2008 |
| JP | 2008-227677 A | 9/2008 |
| JP | 2008-263524 A | 10/2008 |
| JP | 2009-294372 A | 12/2009 |
| JP | 2011-61280 A | 3/2011 |
| JP | 2011-182275 A | 9/2011 |
| JP | 2013-258614 A | 12/2013 |

OTHER PUBLICATIONS

Decision to Grant a Patent in JP Application No. 2015-025469, dated May 26, 2016.
International Search Report in International Application No. PCT/JP2016/053645, dated Mar. 8, 2016.

* cited by examiner

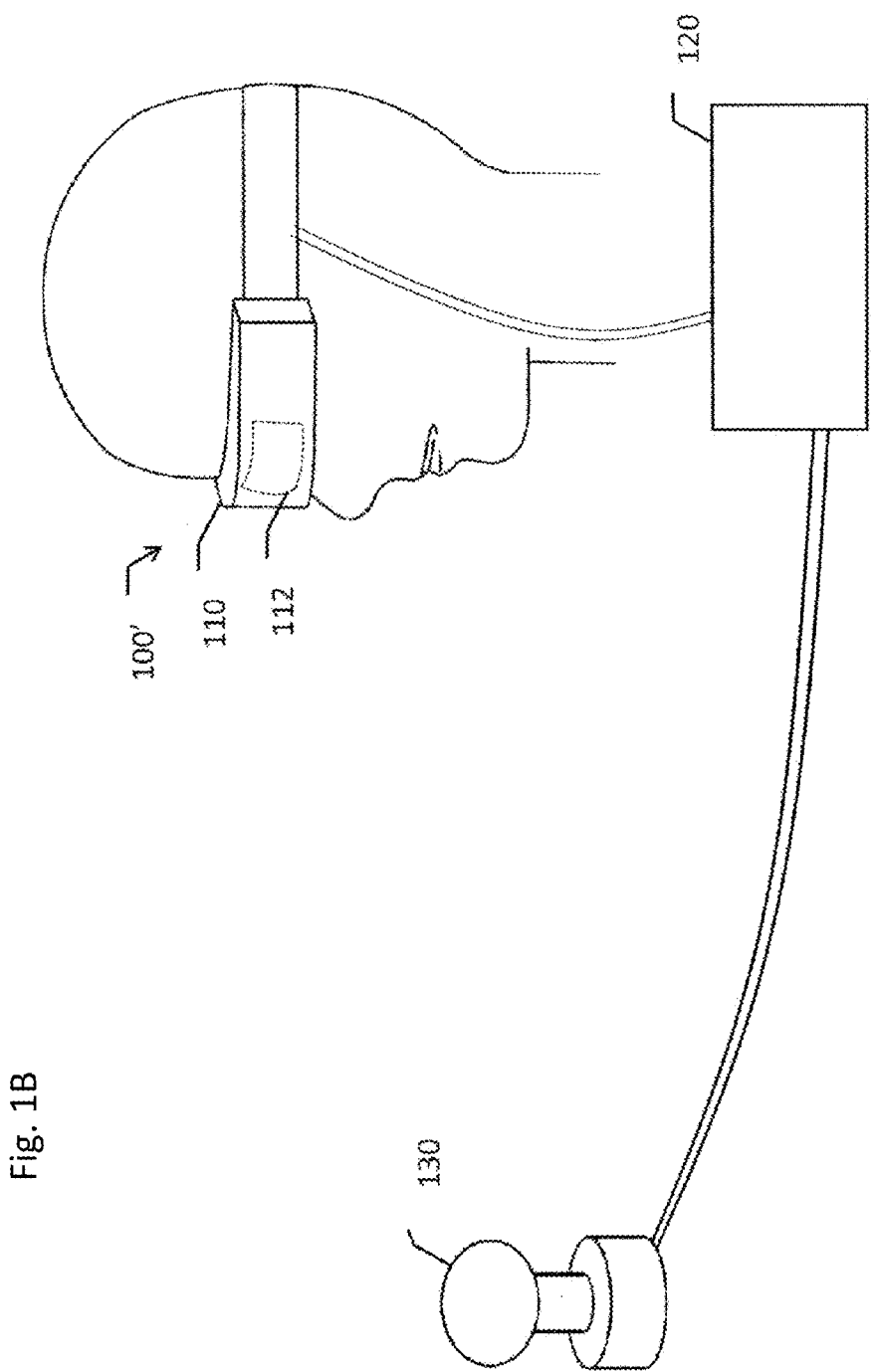

DEVICE AND SYSTEM FOR VIEWING CONTENT USING HEAD-MOUNTED DISPLAY

RELATED APPLICATIONS

The present application is a continuation of International Application Number PCT/JP2016/053645, filed Feb. 8, 2016, which claims priorities from Japanese Application Number 2015-025469, filed Feb. 12, 2015 and Japanese Application Number 2015-110102, filed May 29, 2015. The disclosures of all of the above-listed prior-filed applications are hereby incorporated by reference herein in their entirety.

TECHNICAL FIELD

The present description relates to a content viewing system, method, and system for enabling a user to view a content of a virtual display in a virtual space with use of a head-mounted display.

BACKGROUND ART

There is known a head-mounted display (hereinafter referred to as "HMD") that is wearable on a head of a user and is capable of presenting an image in a virtual space to the user with a display or the like arranged right in front of the user's eyes. In a technology disclosed in Patent Literature 1, JP2013-258614, when the user wearing the HMD turns his/her head, a line-of-sight direction toward a 360-degree panoramic image can be changed in accordance with the turn, and thus the user can be more immersed in an image world.

CITATION LIST

Patent Literature

[PTL 1] JP 2013-258614 A

Information on the head movement of the user, which is acquired by a sensor, is expected to be used not only for identifying the line-of-sight direction toward the panoramic image, but also for a large number of applications to be developed in the future. As an example of such an application, there is assumed an application in which a virtual display arranged in a three-dimensional virtual reality space (hereinafter also referred to as "three-dimensional virtual space", "virtual space", and "virtual reality space") is displayed on the HMD. The virtual display can display a video content, e.g., a TV program, and the user can view a video content through the HMD. However, the user wearing the HMD cannot see his/her hands, and hence the user cannot operate a controller, e.g., a TV remote controller.

SUMMARY

At least one embodiment of the present description employs head movement with an HMD as an alternative to a related-art remote-controller operation performed by a user. In particular, at least one embodiment helps to simplify operation of a remote-controller operation by using the head movement with the HMD in place of a zapping operation, which has been performed by a remote controller in the related art, when one of a plurality of visual and audio contents is selected.

In order to help solve the above-mentioned problem, according to at least one embodiment, there is provided a device to be used for content viewing, including a display unit configured to display, on a head-mounted display, a plurality of virtual displays arranged in a virtual space. The device further includes a selecting unit configured to select one of the plurality of virtual displays based on movement detected by a detector of the head-mounted display. The device further includes a playing unit configured to play a content associated with a selected virtual display, in which the plurality of virtual displays are arrayed in grid sections provided along a celestial sphere surface, and in which the selecting unit is configured to identify one of the grid sections on the celestial sphere surface based on the detected movement, to thereby select one virtual display associated with the identified grid section.

Further, according to at least one embodiment, there is provided a content viewing system, which uses a head-mounted display and includes a plurality of content viewing devices to be connected to individual head-mounted displays, respectively, and a server device to be connected to the plurality of content viewing devices via a network. Each of the plurality of content viewing devices includes a display unit configured to display, on the head-mounted display, a plurality of virtual displays arranged in a virtual space and capable of selecting an arbitrary virtual display based on movement detected by a detector of the head-mounted display. Each of the plurality of content viewing devices further includes a playing unit configured to play each of a plurality of received contents in association with any one of the plurality of virtual displays. Each of the plurality of content viewing device further includes a user viewing data acquiring unit configured to acquire user viewing data of a content played on a specific virtual display so as to transmit the data to the server device. The server device includes a viewing data characteristic determining unit configured to determine viewing data characteristics based on each piece of user viewing data transmitted from each of the plurality of content viewing devices. The plurality of virtual displays are arranged in the virtual space in association with grid sections provided along a celestial sphere surface. One of the grid sections is identified based on the movement detected by the detector, to thereby select one virtual display associated with the identified grid section.

According to at least one embodiment, when a visual and audio content is played in a virtual multi-television environment of the virtual space, a related-art remote-controller operation can be replaced by the head movement with the HMD. In particular, when one of the plurality of visual and audio contents is selected, simple operability can be provided such that the related-art zapping operation with the remote-controller operation is replaced by the head movement with the HMD.

The above-mentioned features and advantages or other features and advantages of at least one embodiment are made clear from the following specific description of embodiments, the attached drawings, and the scope of claims.

BRIEF DESCRIPTION OF DRAWINGS

FIG. 1B is a schematic view of another example of the HMD system to be used in the content viewing system, according to at least one embodiment.

FIG. 1B is defined as a center.

DETAILED DESCRIPTION

Figure 1A:
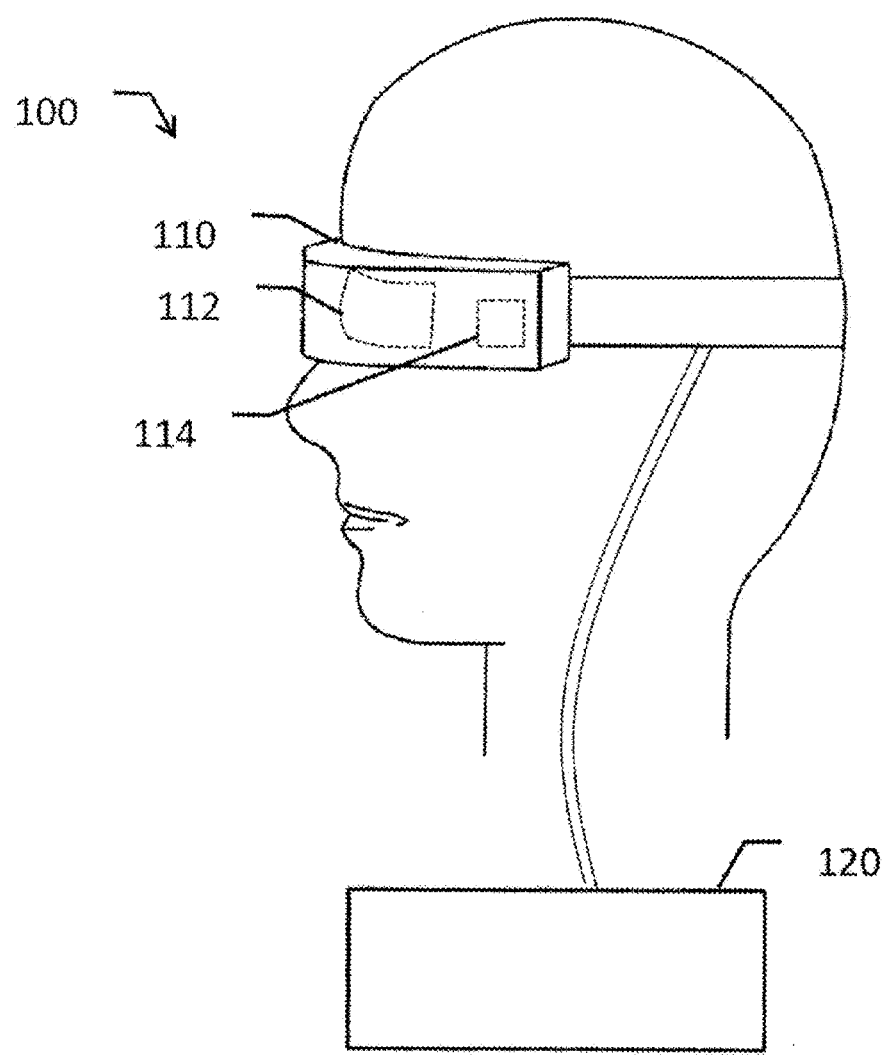
FIG. 1A is a schematic view of an example of an HMD system to be used in a content viewing system, according to at least one embodiment.

First, contents of embodiments are listed and described. A method and a program according to embodiments have at least the following configurations.

[Item 1] A device to be used for content viewing, includes a display unit configured to display, on a head-mounted display, a plurality of virtual displays arranged in a virtual space. The device further includes a selecting unit configured to select one of the plurality of virtual displays based on movement detected by a detector of the head-mounted display. The device further includes a playing unit configured to play a content associated with a selected virtual display. The plurality of virtual displays are arrayed in grid sections provided along a celestial sphere surface. The selecting unit is configured to identify one of the grid sections on the celestial sphere surface based on the detected movement, to thereby select one virtual display associated with the identified grid section.

[Item 2] A device according to Item 1, further including a conditional playing unit configured to simultaneously and conditionally play contents respectively associated with the plurality of virtual displays displayed on the head-mounted display.

[Item 3] A device according to Item 2, in which conditionally playing the contents includes playing visual and audio contents while disabling audio output, and in which playing the content includes enabling the disabled audio output of one of the visual and audio contents.

[Item 4] A device according to Item 2, in which the visual and audio contents are television program contents to be received via a television receiver.

[Item 5] A device according to any one of Items 1 to 4, further including a determining unit configured to determine whether or not the content being played is continuously played for a given time period. The device further includes a content switching unit configured to switch the content being played with a content associated with a virtual display arranged at a predetermined position when it is determined that the content being played is continuously played for the given time period.

[Item 6] A device according to any one of Items 1 to 5, in which the detector is an angular velocity sensor, and in which the detected movement includes inclination information.

[Item 7] A device according to any one of Items 1 to 6, further including a viewing data acquiring unit configured to acquire viewing data of a content played on the selected virtual display to transmit the viewing data to a server device.

[Item 8] A device according to Item 7, further including a viewing data characteristic associating unit configured to receive, from the server device, viewing data characteristics determined based on the viewing data, and to associate the viewing data characteristics with one or more of the plurality of virtual displays.

[Item 9] A device according to Item 8, in which the viewing data characteristics are a broadcaster content viewership rated at a predetermined timing, and in which the viewing data characteristic associating unit is configured to subject the virtual display playing a content having a high broadcaster content viewership to visual processing in the virtual space, to thereby cause the display unit to display the resultant.

[Item 10] A device according to Item 9, in which the broadcaster content viewership is determined based on a total number of the pieces of viewing data transmitted to the server device and a number of users viewing each content.

[Item 11] A content viewing system, which uses a head-mounted display and includes a plurality of content viewing devices to be connected to individual head-mounted displays, respectively. The content viewing system further includes a server device to be connected to the plurality of content viewing devices via a network. Each of the plurality of content viewing devices includes a display unit configured to display, on the head-mounted display, a plurality of virtual displays arranged in a virtual space and capable of selecting an arbitrary virtual display based on movement detected by a detector of the head-mounted display. Each of the plurality of content viewing devices further includes a playing unit configured to play each of a plurality of received contents in association with any one of the plurality of virtual displays. Each of the plurality of content viewing devices further includes a user viewing data acquiring unit configured to acquire user viewing data of a content played on a specific virtual display so as to transmit the data to the server device. The server device includes a viewing data characteristic determining unit configured to determine viewing data characteristics based on each piece of user viewing data transmitted from each of the plurality of content viewing devices. The plurality of virtual displays are arranged in the virtual space in association with grid sections provided along a celestial sphere surface. One of the grid sections is identified based on the movement detected by the detector, to thereby select one virtual display associated with the identified grid section.

Specific examples of an apparatus and a system to be used for content viewing with use of a head-mounted display (HMD) according to embodiments are described below with reference to the drawings. The present description is not limited to those examples, and is defined by the scope of claims. The description is intended to include all modifications within the scope of claims and the equivalents thereof. In the following description, like elements are denoted by like reference symbols in the description of the drawings, and redundant description thereof is omitted.

FIG. 1A is a schematic view of an example of an HMD system 100 to be used in a content viewing system, according to at least one embodiment. The HMD system 100 is a client system, and can communicate to/from a server system via a network. As illustrated in FIG. 1A, the HMD system 100 includes an HMD 110 having a display 112 and a sensor 114 installed thereon, and a control circuit unit 120. The display 112 of the HMD 110 is a non-transmissive display device configured to completely cover the user's field of view such that the user can see only a screen displayed on the display 112. The user wearing the non-transmissive HMD 110 completely loses the field of view of the external world, and hence the user is completely immersed in a virtual space displayed by an application to be executed by the control circuit unit 120. In at least one embodiment, the display 112 is a partially transmissive display.

The sensor 114 of the HMD 110 is fixed near the display 112. The sensor 114 includes a geomagnetic sensor, an acceleration sensor, and/or an angular velocity (gyro) sensor, and can detect various movements of the HMD 110 worn on the head of the user via one or more of the sensors. Particularly in the case of the angular velocity sensor, angular velocities about three axes of the HMD 110 are detected over time depending on the movement of the HMD 110, so that temporal change of the angle (inclination) about each axis can be determined (described later with reference to FIG. 4).

Further, the control circuit unit 120 is included in a user terminal as a content viewing device. The user terminal may be a personal computer, e.g., a desktop computer or a laptop computer, and includes a processor, a main memory, an external memory, a user interface, a communication unit, and a disk drive, which are electrically connected to each other via a bus. Further, in at least one embodiment, the control circuit unit 120 may be mounted inside the HMD 110, or the function of the content viewing device may be distributed between the user terminal and the HMD. Further, in at least one embodiment, one or more of the content viewing devices may be constructed to function as a server device.

Figure 2:
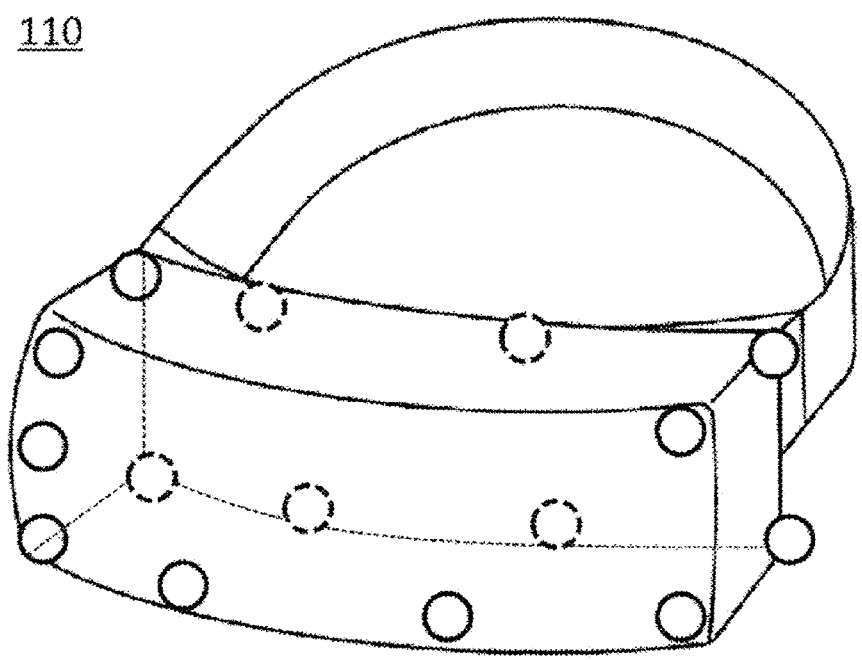
FIG. 2 is a schematic view of a plurality of detection points virtually arranged on an HMD, which are detected by an infrared sensor used in FIG. 1B.

FIG. 1B is a schematic view of another example of an HMD system 100' according to at least one embodiment. The example of FIG. 1B differs from that of FIG. 1A in that the HMD system 100' includes an infrared sensor 130 connected to the control circuit unit 120 so as to enable communication therebetween. Further, the HMD 110 may include or not include the sensor 114 of FIG. 1A. The infrared sensor 130 has a position tracking function. As further illustrated in FIG. 2 as an example of the position tracking function, positions in a real space of a plurality of detection points, which are virtually arranged on the HMD 110 and at which infrared rays are detected, are detected over time in accordance with the movement of the user. In this manner, the temporal change of the angle about each axis depending on the movement of the HMD 110 can be determined based on the change over time of the positions in the real space, which are detected by the infrared sensor 130.

Although not shown in FIG. 1A and FIG. 1B, the HMD systems 100 and 100' may include headphones 116 built into the HMD 110 or the content viewing device (control circuit unit 120). In at least one embodiment, the headphones 116 may be an external type instead of a built-in type. Further, in order for a virtual television in the virtual space to receive a broadcast of a television program, the HMD system 100 or 100' may include an external television receiver 115 or a television receiver 115 built into the content viewing device. In at least one embodiment, the content viewing device is configured to receive a signal from television receiver 115 through a wireless transmission, such as WiFi, Bluetooth™, or another suitable wireless transmission pathway. The television receiver may be any device as long as visual and audio data for television broadcast can be received. The visual and audio data includes a visual content and an audio content. Further, as a controller for the HMD 110, a known portable terminal, e.g., a smartphone, to be held by the user may be used. The controller can be connected to the control circuit unit 120 so as to enable communication and interaction therebetween.

Figure 3:
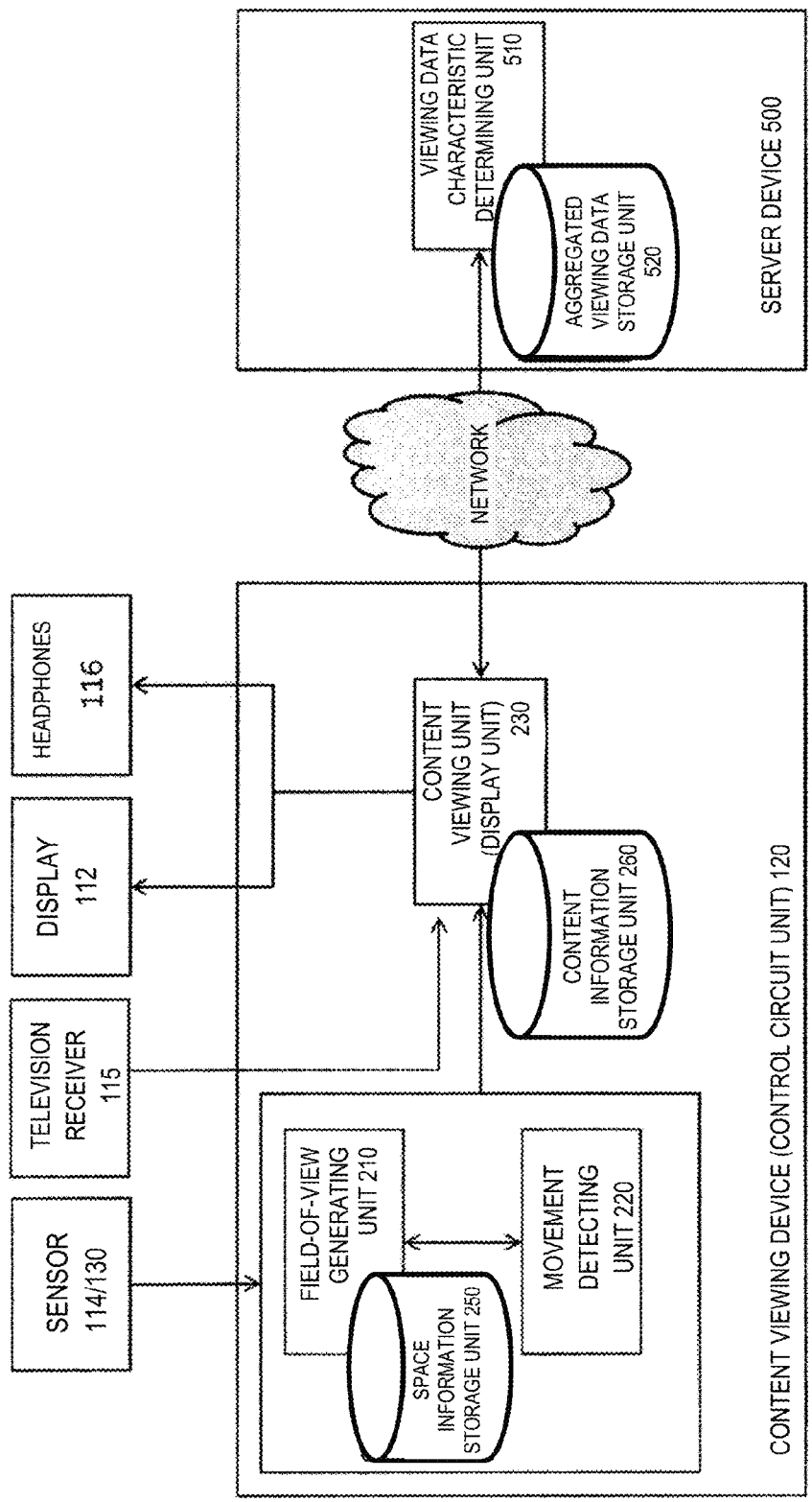
FIG. 3 is a block diagram of a functional configuration of the entire content viewing system, according to at least one embodiment.

FIG. 3 is a functional block diagram of a content viewing system using the HMD, according to at least one embodiment. As illustrated in FIG. 3, the content viewing device (control circuit) 120 and a server device 500 connected to a plurality of content viewing devices 120 interact with each other via a network. An independent HMD is connected to each of the plurality of content viewing devices. The content viewing device 120 includes a field-of-view generating unit 210, a movement detecting unit 220, and a content viewing unit (display unit) 230. The functional blocks 210, 220, and 230 cooperate with various tables stored in a space information storage unit 250, a content information storage unit 260, or other units. Further, the server device 500 includes a viewing data characteristic determining unit 510, and cooperates with various tables stored in an aggregated viewing data storage unit 520 or other units.

The field-of-view generating unit 210 of the content viewing device is configured to generate a field-of-view image to be seen by the user immersed in a three-dimensional virtual space based on three-dimensional virtual space information stored in the space information storage unit 250 and based on detection information on a viewing direction acquired from the sensor 114 or 130. The field-of-view image may be a part of a 360-degree panoramic image. The movement detecting unit 220 is configured to measure movement data of the HMD 110 worn on the head of the user, based on the input of movement information from the sensor 114 or 130. In at least one embodiment, angle information data detected over time by the angular velocity (gyro) sensor is particularly determined.

Figure 4:
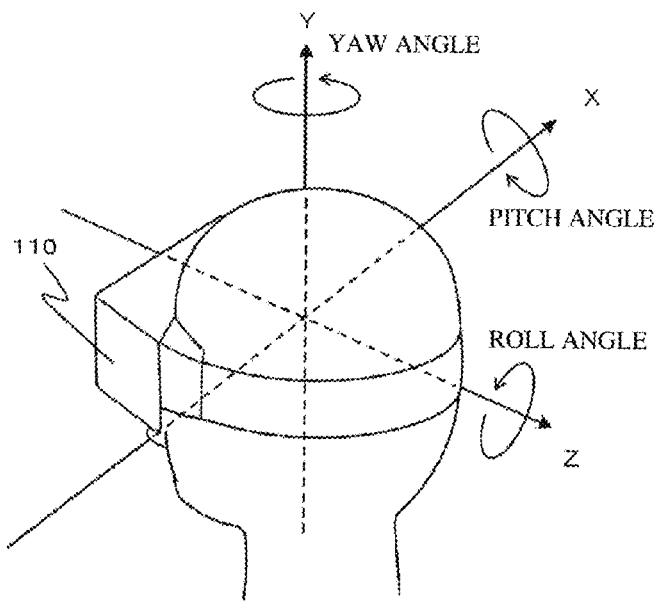
FIG. 4 is an orthogonal coordinate system in a three-dimensional space in which a head of a user wearing the HMD illustrated in FIG. 1A

The angle information data is described with reference to FIG. 4. As illustrated in FIG. 4, XYZ coordinates are defined about the head of the user wearing the HMD. The perpendicular direction in which the user stands upright is a Y-axis, an axis in a direction that is orthogonal to the Y-axis and connects the center of the display 112 and the user is a Z-axis, and an axis in a direction orthogonal to the Y-axis and the Z-axis is an X-axis. The angular velocity (gyro) sensor is configured to detect angles about respective axes (that is, an inclination determined by a yaw angle representing rotation about the Y-axis, a pitch angle representing rotation about the X-axis, and a roll angle representing rotation about the Z-axis). Depending on the change over time of the angles, the movement detecting unit 220 determines the angle (inclination) information data as field-of-view information.

Referring back to FIG. 3, the content viewing unit (display unit) 230 of the content viewing device is configured to cause the HMD to display a plurality of virtual displays arranged in a virtual space. Moreover, in at least one embodiment, the content viewing unit 230 is configured to identify through selection one of the plurality of virtual displays arranged in the three-dimensional virtual space based on the content information stored in the content information storage unit 260 and an inclination angle determined by the movement detecting unit 220. Further, the content viewing unit 230 is configured to play the visual and audio content of the selected virtual display, and to output the content being played to the display 112 and the headphones 116. The content may be in any form including a still image, a moving image, a voice, and the like. In this embodiment, the content is preferred to be, in particular, a broadcaster content of a television program received by the television receiver 115.

The viewing data characteristic determining unit 510 of the server device is configured to aggregate user viewing data transmitted from each content viewing device via the network, and to determine viewing data characteristics based on the user viewing data to store the viewing data characteristics in the aggregated viewing data storage unit 520. Further, the viewing data characteristics are transmitted so as to return to the content viewing device. Further, the server device 500 is configured to manage various types of user information and association groups, and to manage user viewing data histories.

Each element illustrated in FIG. 3 as a functional block for performing various kinds of processing can be constructed of, in terms of hardware, a CPU (Central Processing Unit), a memory, or other integrated circuits, and can be achieved by, in terms of software, various programs loaded into the memory. Therefore, a person skilled in the art would understand that those functional blocks can be achieved by hardware, software, or a combination thereof (the same holds true for the block diagrams of FIG. 9 and FIG. 10 to be described later).

Figure 5A:
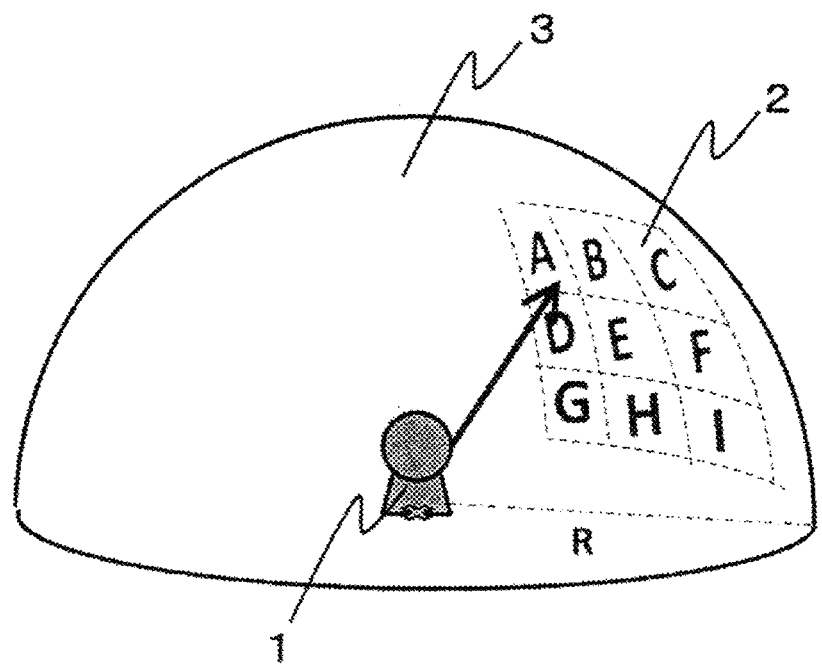
FIG. 5A is a three-dimensional schematic diagram of an arrangement example of a user and virtual displays in a virtual space, which is achieved by the content viewing system, according to at least one embodiment.
Figures 5B, 6A:
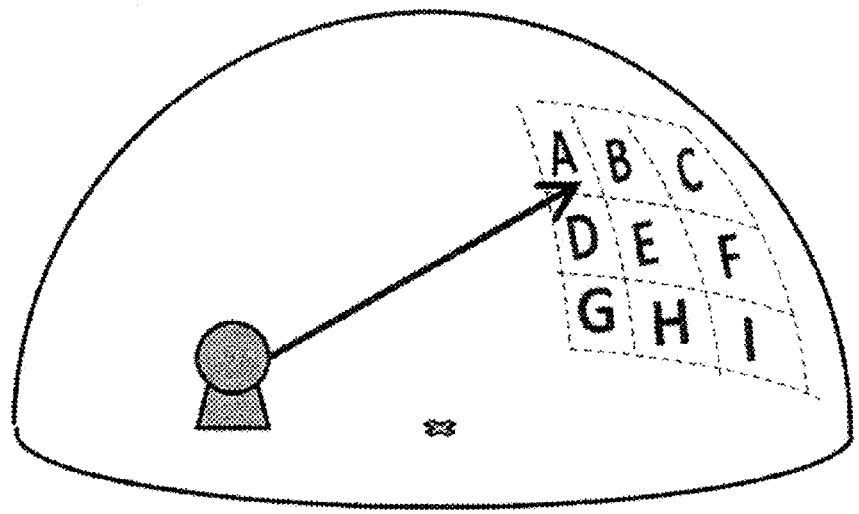
FIG. 5B is a three-dimensional schematic diagram of another arrangement example of the user and the virtual displays in the virtual space, which is achieved by the content viewing system, according to at least one embodiment.
FIG. 6A is a schematic plan view of a display example of broadcaster contents of a virtual multi-display in the virtual space, which is achieved by the content viewing system, according to at least one embodiment.

With reference to FIG. 5A and subsequent figures, content viewing processing to be executed by the above-mentioned content viewing unit 230 according to at least one embodiment is described. FIG. 5A and FIG. 5B are each a schematic example of an arrangement relationship between a user 1 immersed in the three-dimensional virtual space and virtual displays. Each of the plurality of virtual displays surrounded by the dotted lines is arranged on a spherical surface 3 of the entire celestial sphere, and is configured to display each of broadcaster contents A to I on each virtual display. FIG. 5A and FIG. 5B differ from each other in whether the user is virtually located at the center of the sphere, or the user is located away from the center in the virtual space. FIG. 5A corresponds to a case where the HMD system 100 of the example illustrated in FIG. 1A is employed, and FIG. 5B corresponds to a case where the HMD system 100' of another example illustrated in FIG. 1B is employed. That is, when the infrared sensor 130 executes position tracking as in the example of FIG. 1B, the user is not required to be located at the center of the sphere, and the user can move on a plane in the sphere based on the positional relationship between the infrared sensor 130 and the HMD 110.

As illustrated in FIG. 5A and FIG. 5B, a plurality of virtual displays are arranged on the spherical surface 3 of the entire celestial sphere having a radius R in the three-dimensional virtual space. More specifically, a plurality of grid sections 2 are arranged along the celestial sphere surface, and a total of nine (3×3) virtual displays are arranged in association therewith in the grid sections. That is, the virtual display is a spherical display. The shape of the grid section is not limited to a rectangular shape, and may be a triangular shape or other suitable shapes. A plurality of grid sections may be associated with one virtual display. The broadcaster contents A to I associated with all of the virtual displays included in the user's field of view are conditionally played at the same time as an initial state. Conditional playing of the broadcaster content refers to a mode in which, as an example, only a visual content is played and an audio content is disabled (muted) in the broadcaster content.

As also illustrated in a plan view of FIG. 6A, the user wearing the HMD can simultaneously see the visual contents of the respective broadcaster contents A to I on the nine virtual displays. Then, when the user turns his/her head and inclines the HMD, any one of the above-mentioned nine virtual displays can be identified through selection. As described above, in FIG. 5A and FIG. 5B, the HMD is inclined in the direction of the virtual display arranged in the upper left grid section so that the HMD is directed in a specific direction. With this, the virtual display arranged in association with the grid section #1(1) illustrated in FIG. 6A is identified. The mark "x" illustrated in FIG. 6A represents the point on the above-mentioned grid section to which the HMD is directed. The mark "x" may be actually displayed or may not be displayed on the HMD.

In the example of FIG. 6A, when the virtual display in the grid section #1(1) is identified, and the virtual display is actively displayed by, for example, a thick frame and hatching, the broadcaster content A is played (without any condition). That is, the broadcaster content A is now in a state in which not only the visual content but also the audio content is enabled and played. During this period, regarding the broadcaster contents B to I on the displays other than the virtual display in the grid section #1(1), only the visual contents are conditionally played at the same time continuously. For example, further movement of the user's head to incline the HMD, to thereby identify and actively display another virtual display (for example, #3(3)). In this case, this time, the audio content of the content A is disabled (muted), and the audio content of the content I is enabled and played.

The user wearing the HMD inclines and directs the HMD toward any one of the virtual displays to specify any one of the virtual displays, to thereby sequentially change the audio content to be played. That is, a user's zapping operation on a virtual multi-display arranged in the virtual space can be achieved through only the movement of inclining the HMD without any remote-controller operation.

Figure 6B:
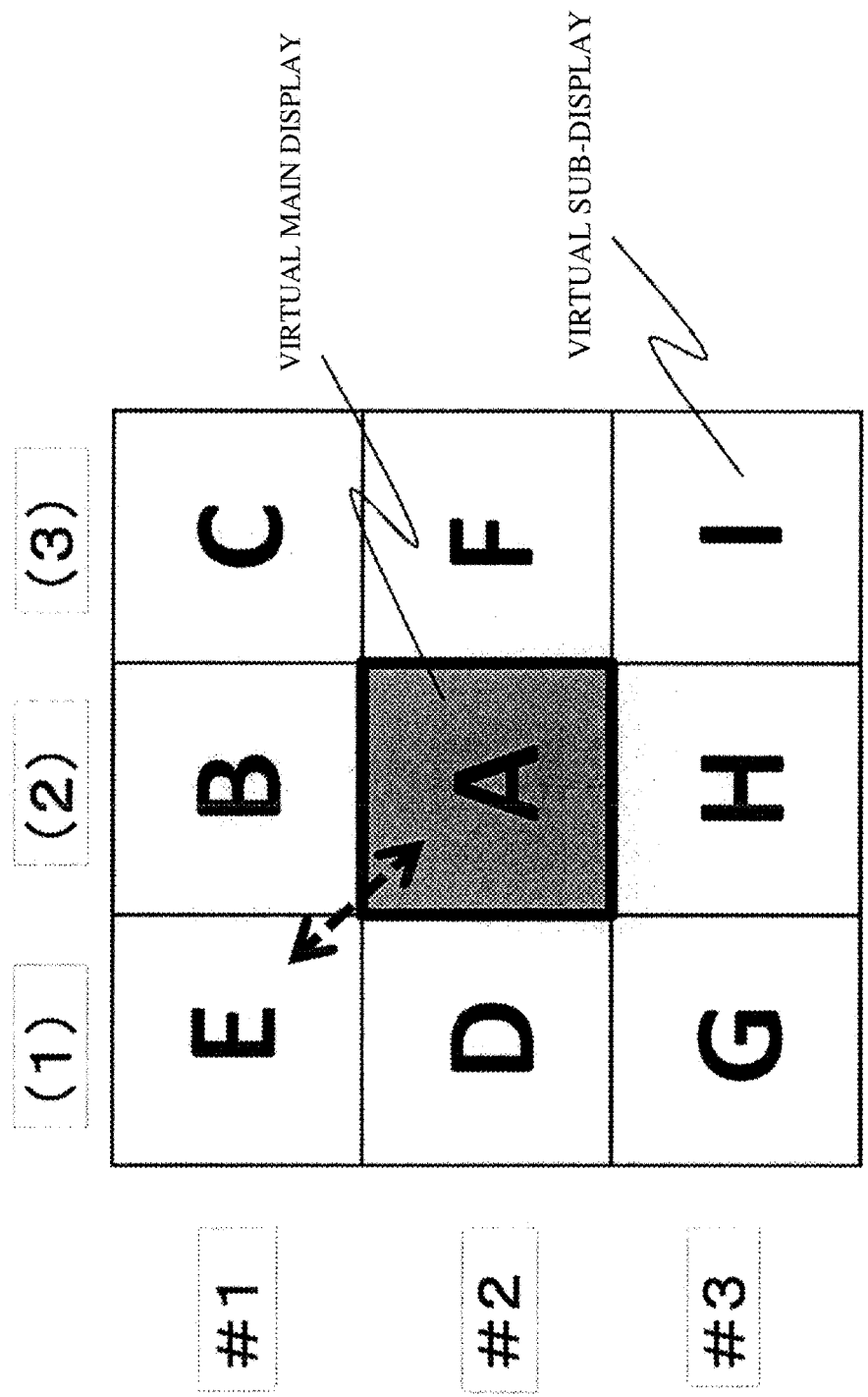
FIG. 6B is a schematic plan view of a display example of the broadcaster contents of the virtual multi-display in the virtual space, which is achieved by the content viewing system, according to at least one embodiment.

According to at least one embodiment, when the user further continues the state of viewing the content A of FIG. 6A for a certain time period, the content A can be shifted to the state illustrated in FIG. 6B. More specifically, as illustrated in FIG. 6B, the content A may be shifted to a display on a virtual display (virtual main display) associated with the grid section #2(2) corresponding to a center portion of the user's field of view. Alternatively, the content E, which has been conditionally played on the virtual display associated with the grid section #2(2) so far, is shifted to a display on the virtual display (virtual sub-display) associated with the grid section #1(1), to thereby switch the visual contents. Regarding the audio content, a state of playing the content A is maintained. This shift processing is based on such a consideration that, when a viewing state is continued for a certain time period, the user's state has likely transitioned from zapping to a viewing operation, and thus the viewing content is preferred to be displayed at the center portion of the field of view.

The user is able to further moves his/her head to incline the HMD, to thereby identify and actively display another virtual television (for example, associated with the grid section #3(3)). In this case, the content of the virtual main display (associated with the grid section #2(2)) and the content of the virtual sub-display (associated with the grid section #3(3)) are switched.

In at least one embodiment, changing is performed such that the audio content is changed before the visual contents are switched. That is, the changing is performed such that, before the visual contents are switched, the audio content of the content A played on the virtual main display is disabled (muted), and the audio content of the content I on the virtual sub-display is played. Through earlier change of the audio content, the user can have a more realistic feeling of change.

As an alternative, when the audio content is changed, the audio content of the content A of the virtual main display may not be suddenly disabled (muted), and each of the audio content of the content A of the virtual main display and the audio content of the content I of the virtual sub-display may be simultaneously played while adjusting the volume of each content. For example, the audio contents may be adjusted to have a volume ratio of a predetermined value, or the audio content of the content A of the virtual main display may be gradually decreased in volume while the audio content of the content I of the virtual sub-display may be gradually increased in volume as time elapses. Other than the above, for example, the outputs of the audio contents may be associated with the right-ear output and the left-ear output of the headphones 116 based on the arrangement relationship between the virtual main display and the virtual sub-display.

Figure 7A:
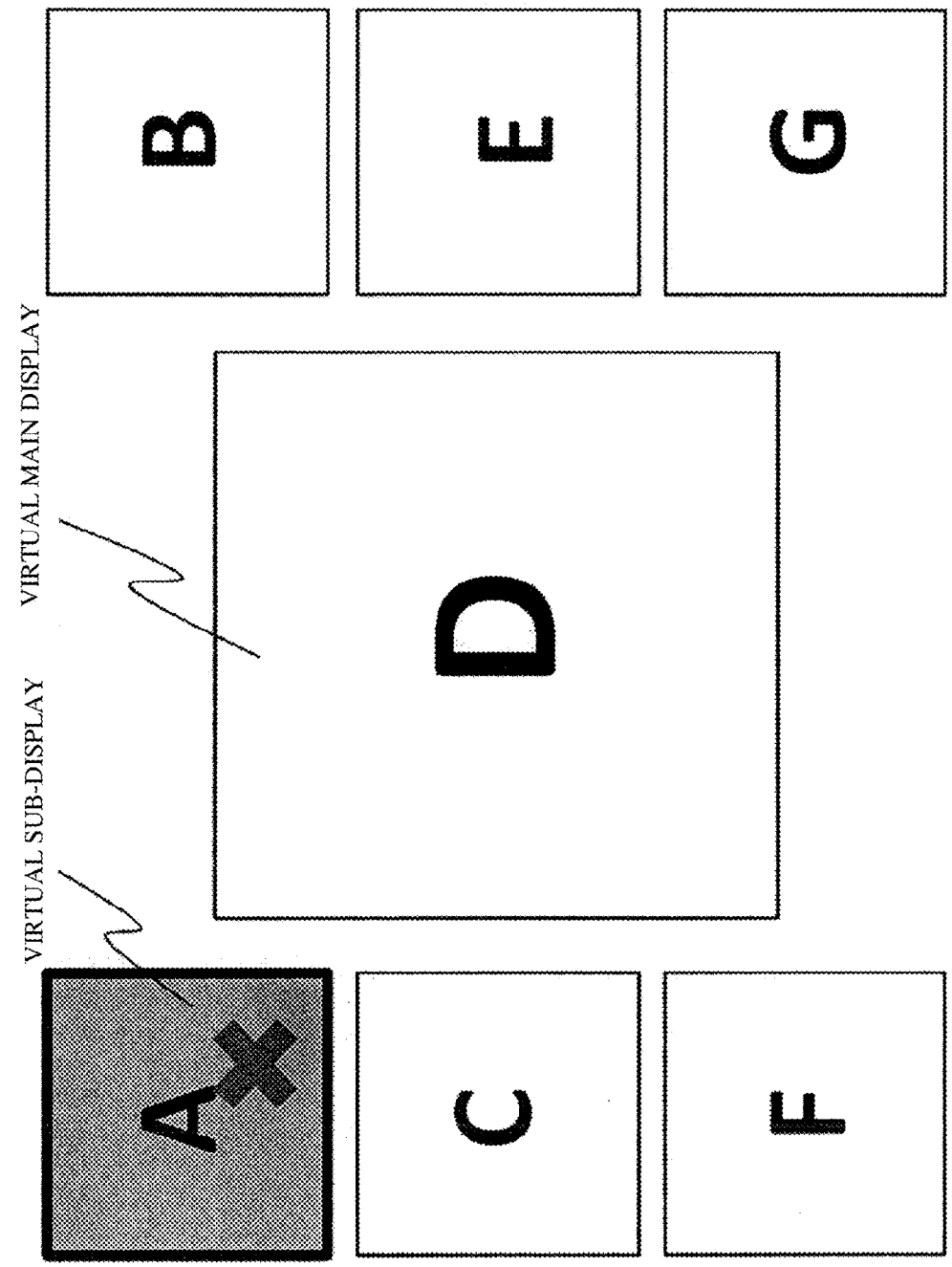
FIG. 7A is a schematic plan view of another display example of the broadcaster contents of the virtual multi-display in the virtual space, which is achieved by the content viewing system, according to at least one embodiment.
Figure 7B:
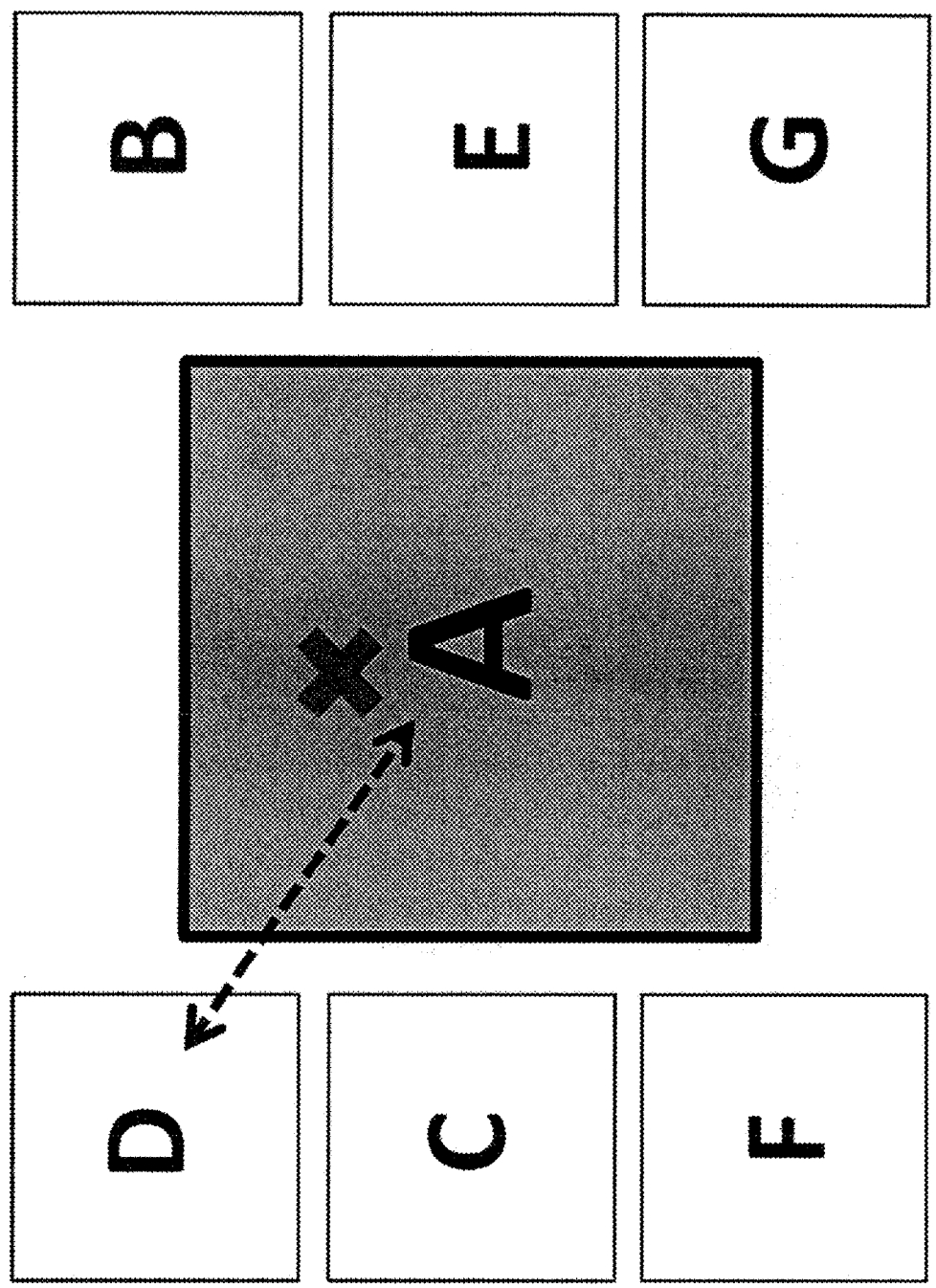
FIG. 7B is a schematic plan view of another display example of the broadcaster contents of the virtual multi-display in the virtual space, which is achieved by the content viewing system, according to at least one embodiment.

Other arrangement examples of the virtual multi-display and broadcaster content display examples corresponding to FIG. 6A and FIG. 6B are illustrated in FIG. 7A and FIG. 7B. As illustrated in FIG. 7A and FIG. 7B, the respective virtual displays may be separately arranged with an arbitrary distance therebetween. Further, the virtual main display arranged at a center portion of the user's field of view may be arranged in an arbitrary size so as to be larger than the virtual sub-displays. That is, as long as each virtual display is associated with at least one grid section provided along the spherical surface 3 of the entire celestial sphere, the virtual multi-display of at least one embodiment can be arranged at a suitable position, size, and/or shape, and the user may be able to set those items.

In the example of FIG. 7A, a total of seven virtual displays are arranged about the virtual main display at the center portion, and the HMD of the user is directed toward the virtual sub-display displaying the broadcaster content A. In this case, both of the audio content and the visual content of the broadcaster content A are played, and only the visual contents of the other broadcaster contents B to F are conditionally played (the audio contents are disabled). Then, when the user maintains the state of viewing the broadcaster content A for a certain time period in FIG. 7A, the state may be shifted to that in FIG. 7B. More specifically, as illustrated in FIG. 7B, the broadcaster content A is shifted to a display on the virtual main display corresponding to the center portion of the user's field of view. Alternatively, the broadcaster content D that has been conditionally played on the virtual main display so far is shifted to a display on the virtual sub-display, and thus the visual contents are switched. As a matter of course, regarding the audio content, a state in which the audio content of the broadcaster content A is played is maintained.

With simple movement of the head of the user wearing the HMD, for the virtual multi-display, a zapping operation mode that has been inconceivable in the related art can be provided to the user. That is, with the operation caused by the movement of the head of the user, the user's zapping operation can be achieved on the virtual multi-display arranged in the virtual space without any remote-controller operation. Thus, screen operability different from that in the real world can be provided to the user.

Figure 8A:
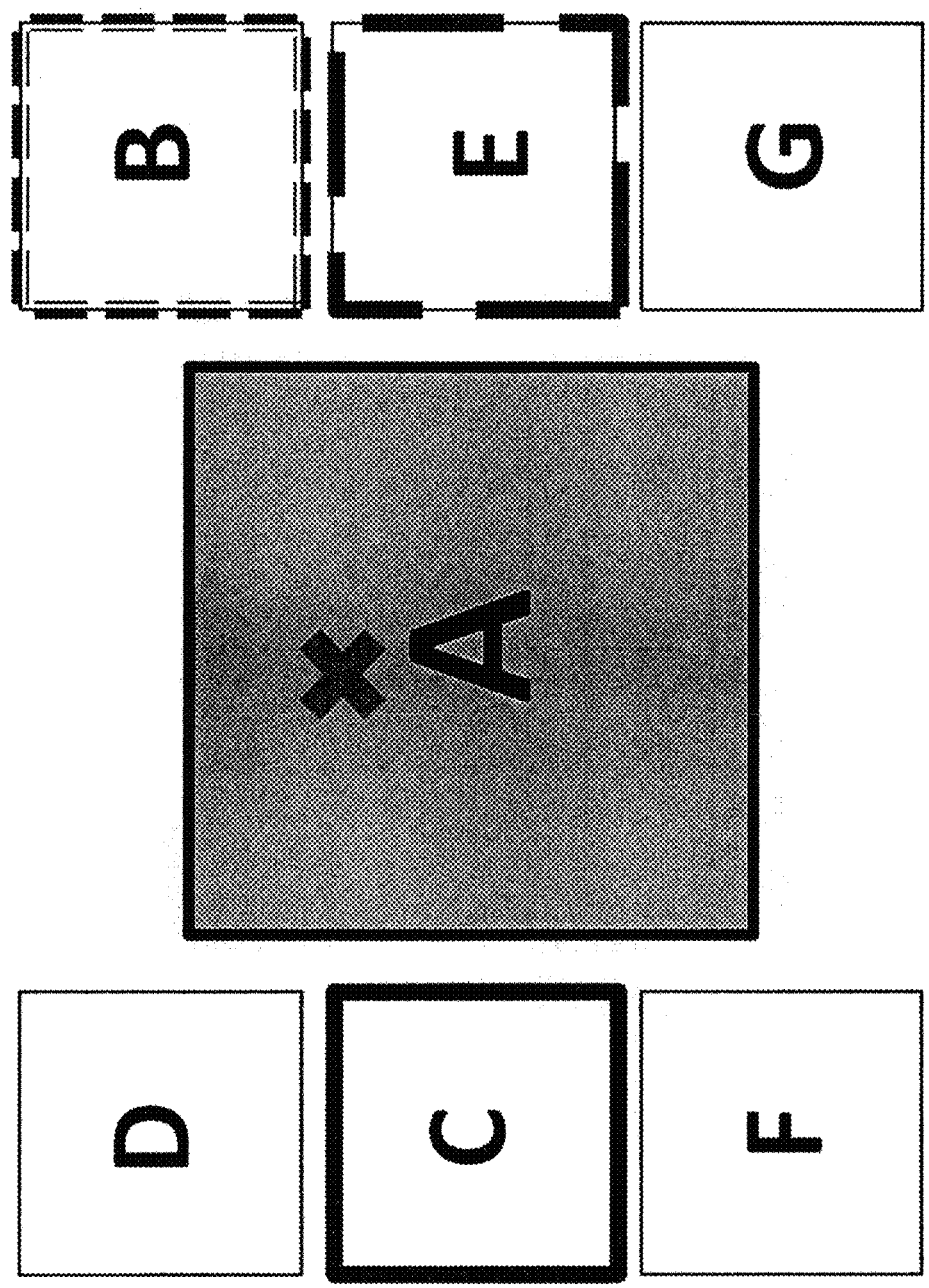
FIG. 8A is a schematic plan view of a display example of contents of the virtual multi-display in the virtual space, which is achieved by the content viewing system and in which an example of viewing data characteristics is reflected, according to at least one embodiment.
Figure 8B:
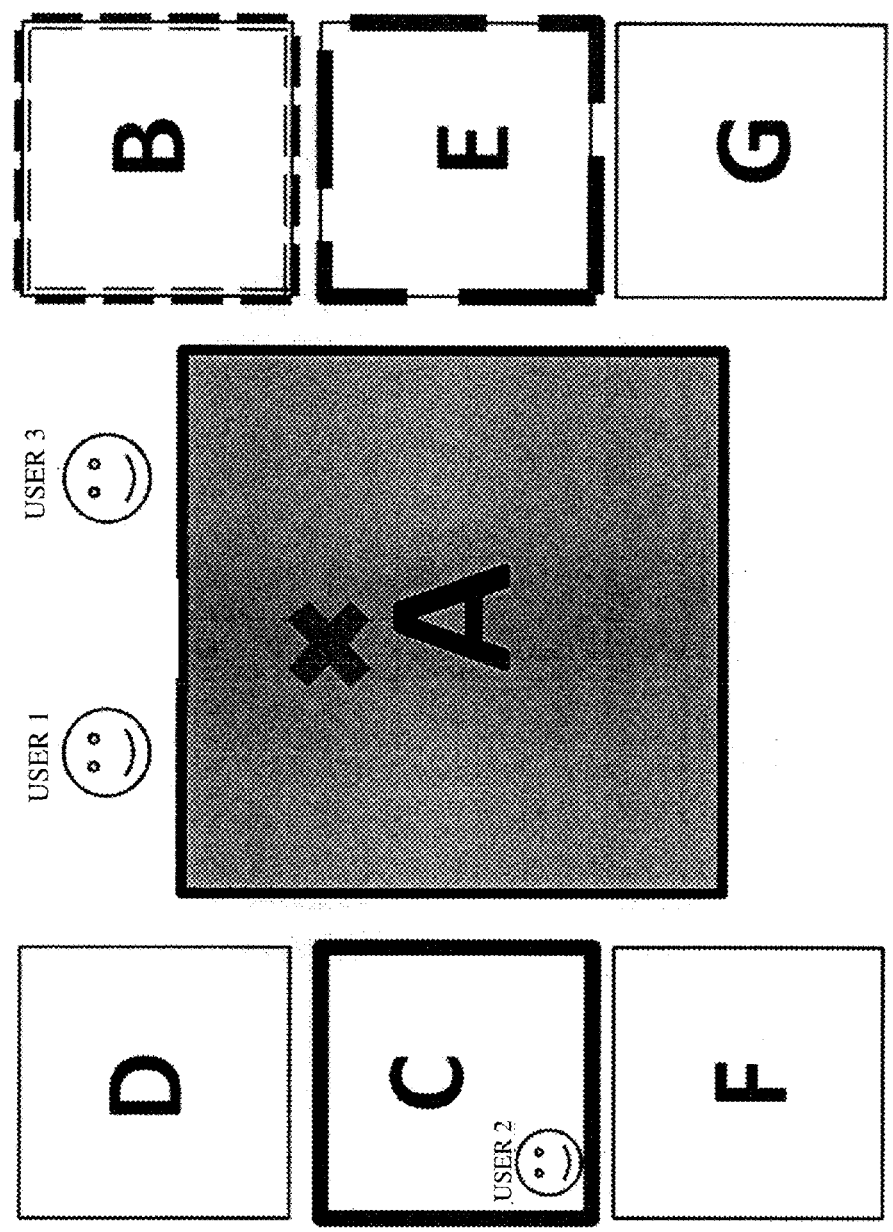
FIG. 8B is a schematic plan view of a display example of the contents of the virtual multi-display in the virtual space, which is achieved by the content viewing system and in which another example of the viewing data characteristics is reflected, according to at least one embodiment.

With reference to FIG. 8A and FIG. 8B subsequent to FIG. 7B, description is made of a display example of contents of the virtual multi-display, which enables the user to understand viewing states of respective users in real time according to at least one embodiment. FIG. 7B is a display example of the virtual multi-display which is viewed by one user wearing the HMD. Meanwhile, in FIG. 8A and FIG. 8B, there is assumed a case where a large number of users wearing individual HMDs are viewing the virtual multi-display with use of a similar application. The content viewing data of the virtual multi-display viewed by each user is transmitted at an arbitrary timing (for example, periodically) to the server device 500 via the network with use of the content viewing device 120. In particular, in at least one embodiment, the information of the broadcaster content played on the virtual main display is acquired (in this case, the broadcaster content A) to transmit the information to the server together with a user ID.

The server configured to receive the content viewing data from each content viewing device aggregates the content viewing data of the broadcaster contents, to thereby calculate viewing data characteristics such as viewership of each broadcast station. Then, the viewing data characteristics are rated to be fed back to each content viewing device. Meanwhile, each content viewing device that has received the rated viewing data characteristics associates the viewing data characteristics with one or more of the plurality of virtual displays. More specifically, in the virtual space, the virtual display playing the highly-rated broadcaster content is subjected to visual processing to be displayed on the HMD. FIG. 8A is a display example of the virtual multi-display subjected to visual processing in response to the feed-back. As illustrated in FIG. 8A, the user is viewing the broadcaster content A of the virtual main display. Meanwhile, the fact that the plurality of users simultaneously using the content viewing system are more favorably viewing the broadcaster contents C, E, and B in the stated order is fed back from the server. The content viewing device also subjects the virtual displays displaying the broadcaster contents C, E, and B to visual display such as a thick frame display (C), a thick frame broken-line display (E), and a thick frame dotted-line display (B). With this, popular contents having high viewership and their order can be presented to the user in real time.

In the display example of FIG. 8B, in addition to the case of FIG. 8A, there is assumed a case where the server device side further performs user group management. For example, there is a case where the user using the content viewing device 120 belongs to the same group as the users 1 to 3, and the users are managed on the server device side. The server device 500 is configured to extract the content viewing data of the users 1 to 3 belonging to the same group based on the user IDs received together with the content viewing data from the content viewing devices 120, to thereby send back the content viewing data together with icon images of the respective users 1 to 3. The content viewing device displays the icon images of the respective users 1 to 3 in the vicinity of the virtual displays as illustrated in FIG. 8B. With this, the fact that the users 1 and 3 are viewing the broadcaster content A and the user 2 is viewing the broadcaster content C can be presented to the user in real time. According to at least one embodiment, through the interaction with the server, the user can know in real time the viewing data characteristics such as the viewership of the broadcaster content and which broadcaster content the members of the user group are viewing, while viewing the broadcaster content on the virtual multi-display.

Figure 9:
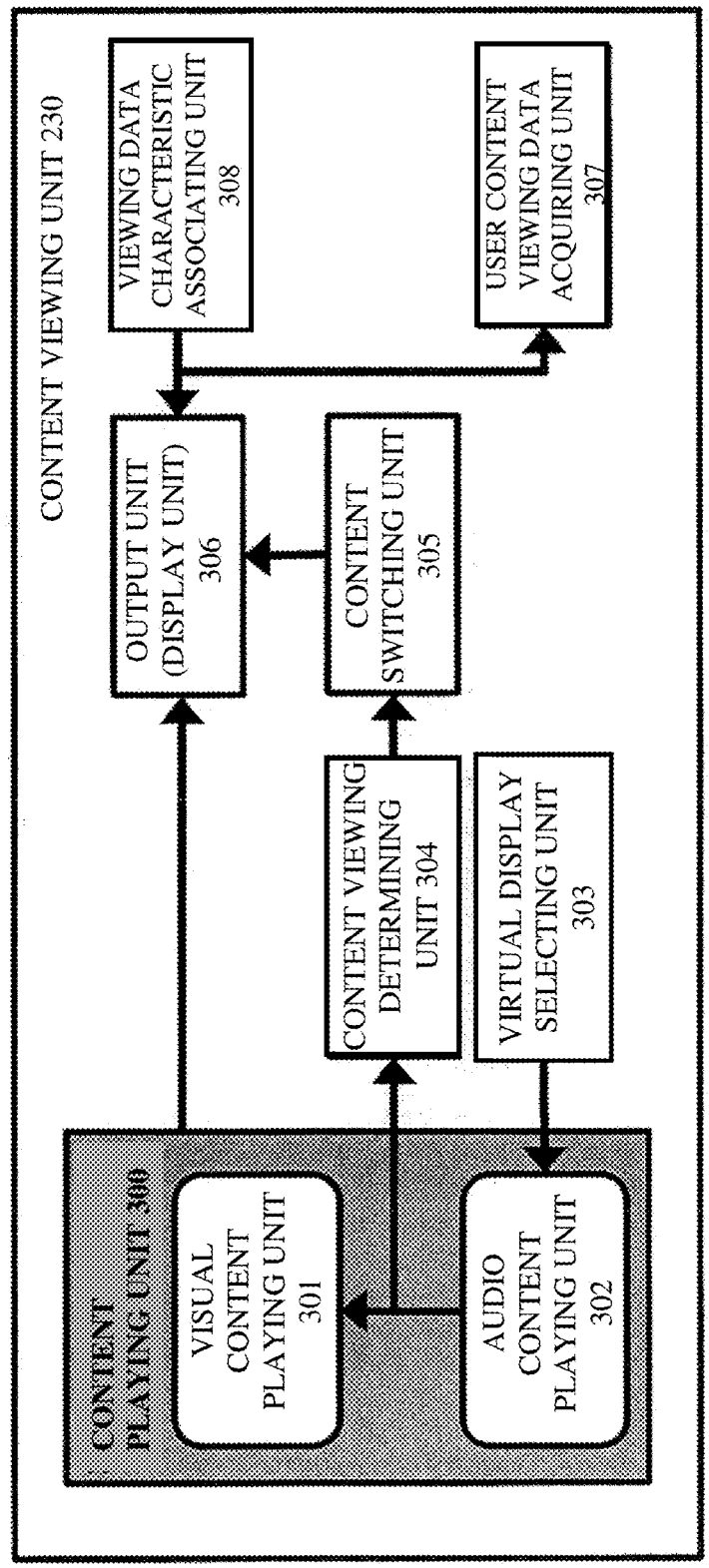
FIG. 9 is a block diagram of a functional configuration of a content viewing unit included in a content viewing device included in the content viewing system, according to at least one embodiment.
Figure 10:
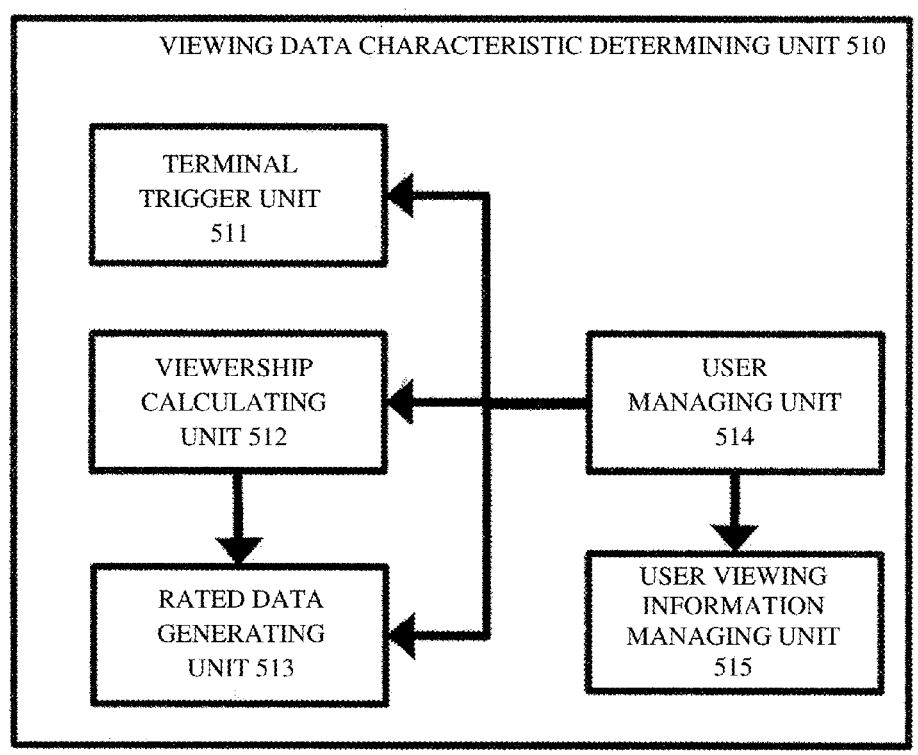
FIG. 10 is a block diagram of a functional configuration of a viewing data characteristic determining unit included in a server device in the content viewing system, according to at least one embodiment.
Figure 11:
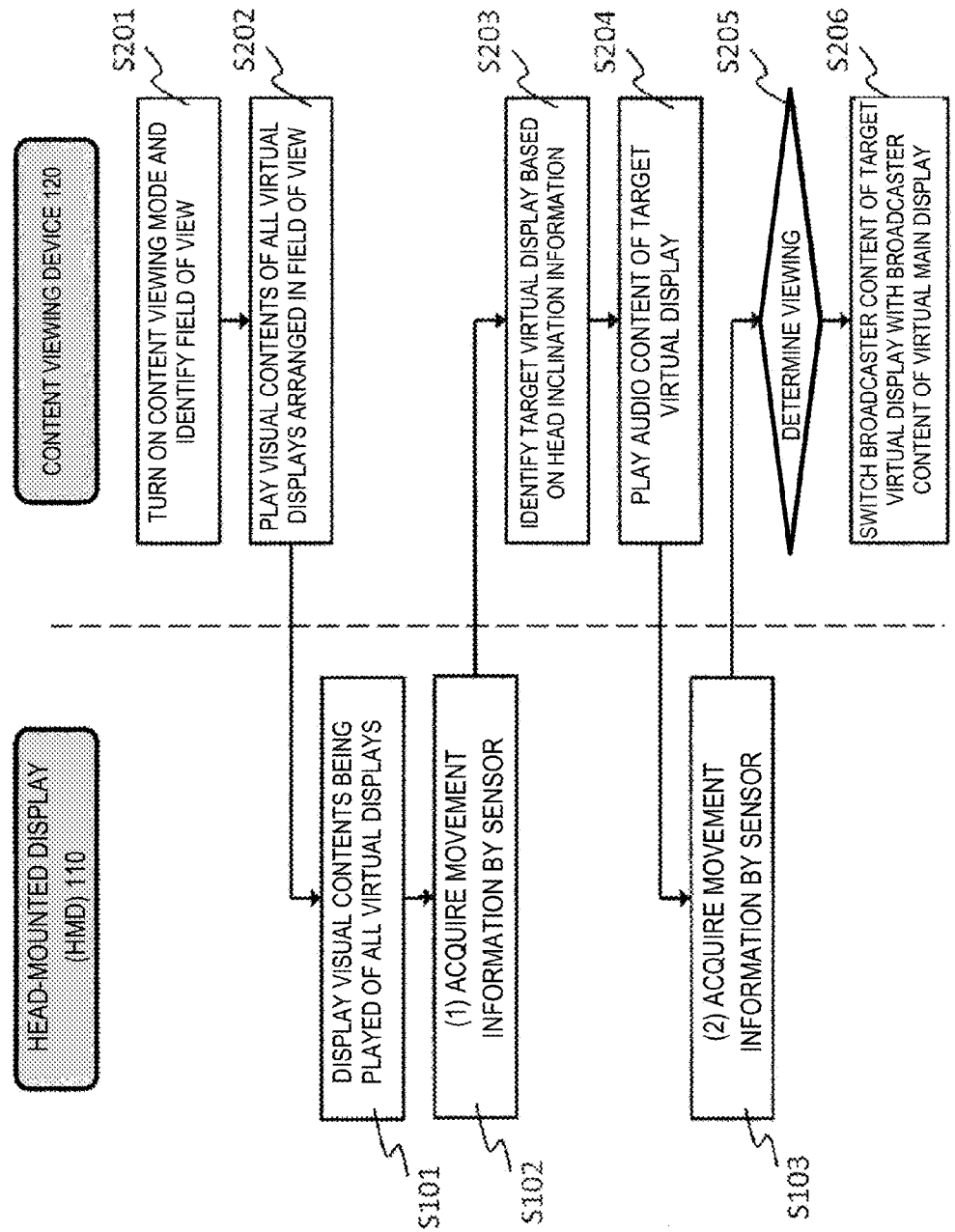
FIG. 11 is a flow chart of an example of a flow of processing that relates to content viewing in the content viewing system and is performed between the HMD and the content viewing device, according to at least one embodiment.
Figure 12:
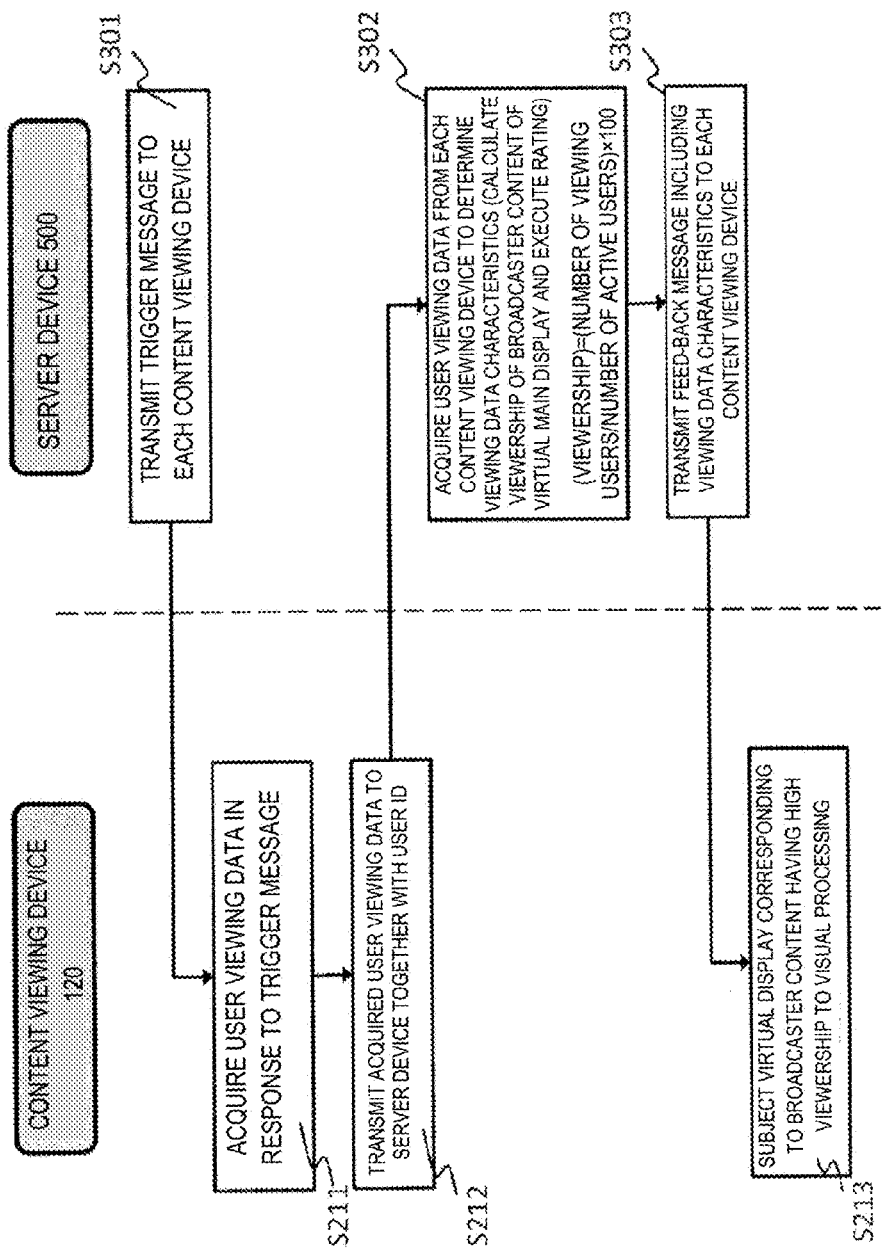
FIG. 12 is a flow chart of an example of the flow of the processing that relates to content viewing in the content viewing system and is performed between the content viewing device and the server device, according to at least one embodiment.

Details of the processing relating to content viewing described above with reference to FIG. 5A to FIG. 8B are now further described with reference to FIG. 9 to FIG. 13. FIG. 9 is a detailed exemplary functional block diagram of the content viewing unit 230 included in the content viewing device described with reference to FIG. 3. Further, FIG. 10 is a detailed exemplary functional block diagram of the viewing data characteristic determining unit 510 included in the server device described with reference to FIG. 3. FIG. 11 is a detailed exemplary flow chart that relates to the content viewing processing and represents processing between the HMD and the content viewing device. FIG. 12 is a detailed exemplary flow chart that relates to the content viewing processing and represents processing between the content viewing device and the server device.

As illustrated in FIG. 9, the content viewing unit 230 includes a content playing unit 300 including a visual content playing unit (conditional content playing unit) 301 and an audio content playing unit 302, a virtual display selecting unit 303, a content viewing determining unit 304, a content switching unit 305, an output unit (display unit) 306, a user content viewing data acquiring unit 307, and a viewing data characteristic associating unit 308. The playing unit 300 is configured to play each of the plurality of broadcaster contents received by the television receiver in association with any one of the virtual displays. The visual content playing unit 301 is configured to conditionally play only the visual contents at the same time for the visual and audio contents respectively associated with the plurality of virtual displays displayed on the HMD. In particular, the visual content playing unit 301 is configured to play only the visual contents for the moving-image contents with audio of the television programs received via the television receiver (e.g., visual and audio contents of a broadcaster) while disabling (that is, muting) the audio contents.

The audio content playing unit 302 is configured to enable the audio content, which is associated with the virtual display selected by the virtual display selecting unit 303 and is disabled by the visual content playing unit 301, to thereby play the entire content. That is, the content playing unit 300 is configured to superimpose the plurality of visual contents played by the visual content playing unit 301 with one audio content played by the audio content playing unit 302, and to output the result to the output unit 306 so that the user can view the content. The virtual display selecting unit 303 is configured to select any one of the virtual displays depending on the movement detected by the sensor (114 or 130) of the HMD. More specifically, as described above, the sensor may be an angular velocity sensor, and the detected movement of the HMD includes inclination information. Then, as illustrated in FIG. 5A to FIG. 7B, the virtual display selecting unit 303 can identify a grid section on the spherical surface 3 of the celestial sphere based on the inclination and the position of the HMD, to thereby identify through selection the virtual display associated with the identified grid section.

The content viewing determining unit 304 is configured to determine whether or not the user has continuously listened to the audio content, which is enabled and played by the audio content playing unit 302, for a certain time period. That is, the content viewing determining unit 304 is configured to determine whether or not the broadcaster content is continuously played for a given time period. The content being continuously played for a given time period means that the user's operation is determined to be shifted from zapping to the viewing mode. In this case, the content switching unit 305 switches the broadcaster content being played with the broadcaster content associated with the virtual display arranged at a predetermined position, and outputs the result to the output unit 306. In particular, in at least one embodiment, the broadcaster content being played is switched with the broadcaster content of the virtual main display corresponding to the center portion of the field of view.

The user content viewing data acquiring unit 307 is configured to acquire the user viewing data of the broadcaster content played on the virtual main display at a predetermined timing, to thereby provide the data to the server device together with the user ID. In at least one embodiment, the user viewing data includes broadcaster information and a content number of the broadcaster content played on the virtual main display, and further the broadcaster content arranging order of the virtual main display and the virtual sub-displays. Further, in at least one embodiment, the predetermined timing is a timing at which a trigger message is received from the server. However, the person skilled in the art may understand that the present invention is not limited thereto.

The viewing data characteristic associating unit 308 is configured to receive the viewing data characteristics from the server device via the network, and then associate the viewing data characteristics with one or more of the plurality of virtual displays in the virtual space. The viewing data characteristics include, for example, a broadcaster content viewership. Further, the viewing data characteristic associating unit 308 is configured to subject the virtual display playing the broadcaster content having a high broadcaster content viewership to visual processing in the virtual space as exemplified in FIG. 8A to be displayed on the HMD. Alternatively, the viewing data characteristics correspond to information on the broadcaster contents displayed on the virtual main displays of other users belonging to the same user group in his/her virtual spaces. In this case, the viewing data characteristic associating unit 308 performs visual processing in the virtual space such that icons of the other users are displayed in the vicinity of the virtual displays playing the broadcaster contents viewed by the other users as in FIG. 8B, to thereby cause the HMD to display the result.

The output unit 306 is configured to display the field of view based on the virtual space on the display 112 of the HMD. The output unit 306 is further configured to output the visual contents of the plurality of virtual displays arranged in the virtual space to the display 112 of the HMD together with the virtual space image, and to further output the audio content to the headphones 116 of the HMD.

As illustrated in FIG. 10, the viewing data characteristic determining unit 510 included in the server device 500 includes a terminal trigger unit 511, a viewership calculating unit 512, a rated data generating unit 513, a user managing unit 514, and a user viewing information managing unit. The terminal trigger unit 511 is configured to transmit a trigger message to each content viewing device at a predetermined timing, e.g., per minute, to thereby synchronize the respective content viewing devices. Further, the terminal trigger unit 511 is configured to instruct each content viewing device to acquire the user viewing data. A person skilled in the art would understand that, when each content viewing device includes other means for synchronizing the respective content viewing devices, e.g., a timer, the server device 500 is not required to include the terminal trigger unit 511.

When the user viewing data is received from each content viewing device, the viewership calculating unit 512 calculates the broadcaster content viewership at a predetermined rate to determine the viewing data characteristics. In at least one embodiment, the predetermined rate is, for example, per minute in accordance with the transmission timing of the trigger message in the terminal trigger unit 511. Further, for example, the broadcaster content viewership may be calculated as follows based on the number of pieces of the user viewing data transmitted to the server (that is, the number of active users that have transmitted the user viewing data), and the number of users viewing each broadcaster content, which is aggregated based on the user viewing data.

(Broadcaster content viewership)=(Number of viewing users/Number of active users)×100

The mode of calculating the broadcaster content viewership is not limited to the above-mentioned mode. Other than the above, for example, the broadcaster content viewership may be calculated based on the user information stored in the user managing unit 514 in accordance with sex, age groups, residential areas, and the like. Further, the broadcaster content viewership may be calculated within a limited specific user group.

After the viewership calculating unit 512 calculates the broadcaster content viewership, the rated data generating unit 513 then performs rating based on the broadcaster content viewership. For example, ranking of the broadcaster contents based on the viewership, or ranking of the broadcaster contents based on comparison with the broadcaster content viewership in the past is performed. The user managing unit 514 is configured to manage various types of user information. Examples of the user information include a user ID, a group ID, a user icon image, and user authentication information. The user viewing information managing unit 515 can store the user viewing data associated with each user ID and the history information thereof, and retrieve and acquire the user viewing data of each user.

As illustrated in FIG. 11, the information processing on the user side relating to content viewing is executed through interaction between the HMD 110 and the content viewing device 120. In Step S201, on the application, a content viewing mode is turned on, and the field of view of the virtual space is determined. With this, the user wearing the HMD enters the state illustrated in FIG. 5A and FIG. 5B in the virtual space. In Step S202, as the initial state, the visual contents of all of the virtual displays arranged in the field of view are conditionally played by the visual content playing unit 301, and are output to the output unit 306.

After Step S202, in Step S101, as illustrated in FIG. 6A and FIG. 7A, the HMD 110 displays the visual contents of all of the virtual displays in the field of view, which have been played and output to the output unit 306. While the visual contents are displayed, the HMD 110 further acquires the HMD movement information from the sensor 114 or 130 in Step S102, to thereby supply the information to the content viewing device 120. In particular, the information data on a head rotation (inclination) obtained by the angular velocity sensor 114 and/or the information data on a position in the virtual space obtained by the infrared sensor 130 is acquired.

In the content viewing device 120 that has acquired the movement information, in Step S203, the virtual display selecting unit 303 identifies the virtual display being a target through selection based on the movement information. As an example, with use of the data on the inclination of the HMD determined based on the yaw angle, the pitch angle, and the roll angle, which are illustrated in FIG. 4 and included in the head rotation information obtained by the angular velocity sensor, and with arbitrary use of the information data on the position in the virtual space, which is obtained by the infrared sensor 130, there are calculated coordinates of an absolute position of an intersection at which a vector of the HMD inclination direction (arrow in FIG. 5A and FIG. 5B) intersects with the spherical surface 3 having the radius R. Then, the grid-section region of the sphere surface at which the calculated coordinates of the absolute position are located is determined, to thereby identify one grid section and the virtual display associated with the grid section. In at least one embodiment, the association of the grid section and the virtual display is stored in the content information storage unit 260 as a table.

When the target virtual display is identified in Step S203, subsequently, the content viewing device 120 plays the content of the target virtual display in the content playing unit 300. In this case, the audio content of the target virtual display, which has been disabled in Step S202 by the audio content playing unit 302, is enabled and played. In Step S204 and steps thereafter, the HMD 110 continuously acquires the HMD movement information in Step S103 to supply the information to the content viewing device 120.

Meanwhile, in Step S205, the content viewing device 120 monitors the time that the broadcaster content of the target virtual display is continuously played by the content viewing determining unit 304, and determines whether or not the content is continuously played for a predetermined time period. When the content is continuously played for the predetermined time period, in Step S206, a determination is made that the user's operation is shifted from the zapping mode to the viewing mode. In order to display the broadcaster content of the target virtual display on a virtual main display, the content switching unit 305 switches the content of the target virtual display with the content of the virtual main display associated with a predetermined grid section on the spherical surface 3, which corresponds to the center of the field of view (see also FIG. 6B and FIG. 7B). The shift processing of Step S206 is not limited to the processing of switching the content of the target virtual display with the content of the virtual main display. For example, the contents to be switched may also be sequentially slid or rotated.

FIG. 12 is an illustration of information processing executed through interaction between the content viewing device 120 and the server device 500 during content viewing, which corresponds to FIG. 8A. In Step S301, the terminal trigger unit 511 of the server device transmits a trigger message to the content viewing device that is currently connected to the server at a predetermined rate, e.g., per minute. In response to the reception of the trigger message, in Step S211, the user content viewing data acquiring unit 307 of the content viewing device acquires the user viewing data at a timing at which the trigger message is received. In particular, the broadcaster information and the content number of the broadcaster content associated with the virtual main display are acquired. Subsequently, in Step S212, the acquired user viewing data is transmitted to the server device 500 together with the user ID.

In Step S302, the server device 500, which has received the user viewing data from each content viewing device, determines the viewing data characteristics by the viewership calculating unit 512. More specifically, the viewership calculating unit 512 calculates the viewership of the broadcaster content associated with the virtual main display in each content viewing device, and the rated data generating unit 513 executes the rating of the broadcaster content viewership. In Step S303, the determined viewing data characteristics are transmitted to the content viewing device 120 as a feed-back message. In Step S213, the content viewing device 120 that has received the feed-back message associates the viewing data characteristics with one or more of the plurality of virtual displays by the viewing data characteristic associating unit. More specifically, the virtual display playing the broadcaster content having a high broadcaster content viewership is subjected to visual processing in the virtual space as illustrated in FIG. 8A to be displayed on the HMD.

Figure 13:
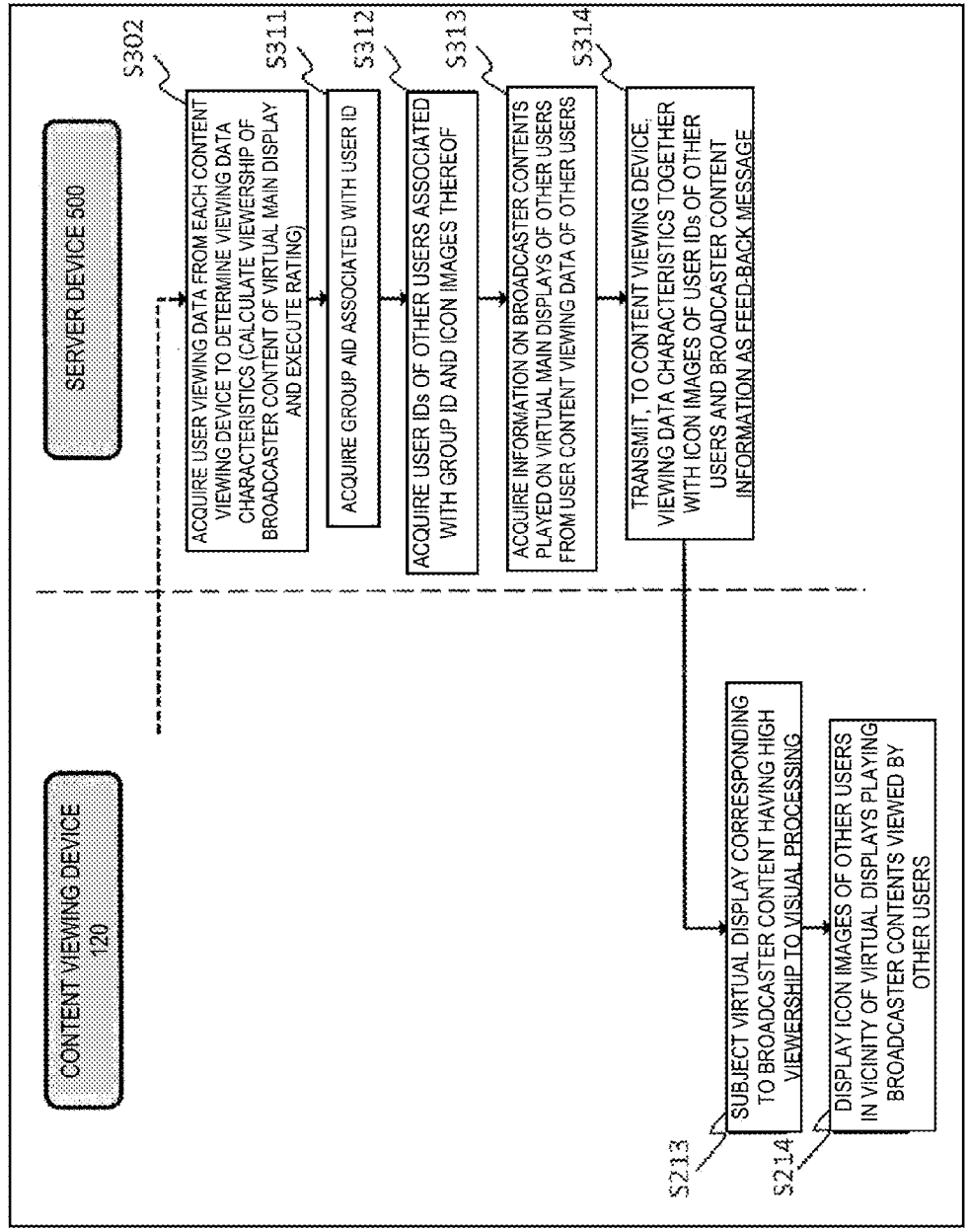
FIG. 13 is a flow chart of another example of the flow of the processing that relates to content viewing in the content viewing system and is performed between the content viewing device and the server device, according to at least one embodiment.

FIG. 13 is an illustration of information processing executed through interaction between the content viewing device 120 and the server device 500 during content viewing, which corresponds to FIG. 8B. The flow until Step S302 is the same as that in FIG. 12, and hence description thereof is omitted herein. In Step S311, the user managing unit 514 acquires the group ID associated with the user ID transmitted from the content viewing device, and, in Step S312, subsequently acquires the user IDs of other users associated with the group ID and his/her registered icon images. In Step S313, the user viewing information managing unit 515 uses the other user IDs to acquire the user viewing data of the other users transmitted to and stored in the server device, in particular, the information of broadcaster contents currently played on the virtual main displays in the content viewing devices of the other users. That is, which broadcaster contents the other users are viewing on the virtual main displays are identified in real time. Next, in Step S314, not only the viewing data characteristics are transmitted to the content viewing device, but also the icon images of the other users and the broadcaster content information of the other users identified in Step S313 are transmitted as a feed-back message.

In Step S213, the content viewing device 120 that has received the feed-back message associates the viewing data characteristics with one or more of the plurality of virtual displays by the viewing data characteristic associating unit 308. More specifically, the virtual display playing the broadcaster content having a high broadcaster content viewership is subjected to visual processing in the virtual space as illustrated in FIG. 8A to be displayed on the HMD. In addition thereto, in Step S214, as illustrated in FIG. 8B, the icon images of the other users are associated with the virtual displays currently displaying the broadcaster content information viewed by the other users, and are displayed in the vicinity of the virtual displays.

Figure 14:
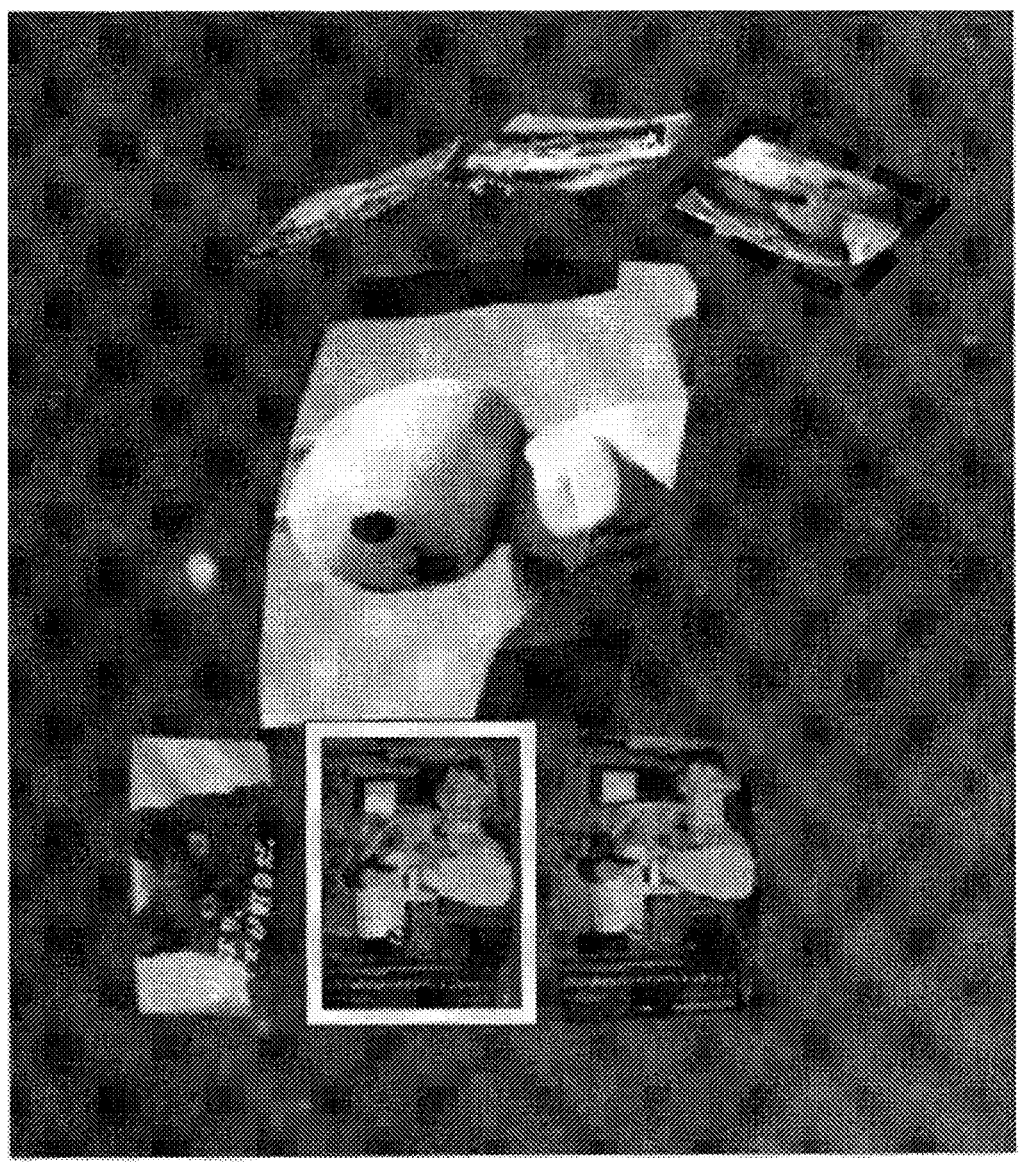
FIG. 14 is an example of a screen image implemented by a content viewing application, according to at least one embodiment.

FIG. 14 is an example of a screen to be displayed on the HMD, which is implemented based on the embodiment of the present invention. FIG. 14 corresponds to FIG. 8A, in which the virtual main display is arranged at the center and three virtual sub-displays are three-dimensionally arranged on each side of the virtual main display.

Under this state, as an example, the HMD is directed to the direction of the virtual display at the left of the lower row, and this virtual display is selected as the target virtual display. When the inclination of the HMD toward the target virtual display is maintained for a certain time period, the screen is changed, and the target virtual display is shifted to a main display part at the center so that its content is displayed in an enlarged manner and its audio content is also played. The broadcaster contents displayed on the virtual sub-display are conditionally played and displayed. The broadcaster contents displayed on the virtual sub-displays are conditionally played and displayed. When the user further inclines the HMD to direct the HMD toward any one of the sub-displays, and a certain time period has elapsed, the content of the sub-display to which the HMD is directed is next switched with the content of the main display. When the user wearing the HMD inclines the HMD such that the HMD is directed to any one of the virtual displays to specify one virtual display, the audio content can be sequentially changed.

In addition thereto, in FIG. 14, the solid-line frame and the dotted-line frame are visually displayed on the middle virtual display in the left column and the lower virtual display in the right column, respectively. This represents that the viewership of the broadcaster contents displayed on those virtual displays are high. The user viewing information is transmitted to the server via the network, and the server aggregates the viewing data of each user of the broadcaster content in real time to enable feed-back.

Embodiments of the present description have been described above. The content viewing system according to the embodiment of the present description is applied to an application for displaying, on the HMD, the virtual multi-display arranged in the virtual space. In particular, the content viewing system is applied to an application in which the virtual display is a virtual television, in which the visual and audio content (television program) of the broadcast station received by the television receiver or the like is played in the virtual space, and in which the user wearing the HMD views the broadcaster content.

In the related art, when the user views a television program, the user often performs an operation called zapping of operating a remote controller to switch channels. When the user is wearing the HMD and is immersed in the virtual space, however, the user cannot easily see his/her hands, and thus buttons of the remote controller may be erroneously operated. Further, in the related art, regarding television programs, the user has difficulty knowing which broadcaster content is popular in real time. For example, viewership data is released by a third-party organization after the broadcast is ended, and hence the user viewing the broadcaster content was unable to know the viewership of the broadcaster content in real time.

According to embodiments of the present description, the general controller operation, e.g., changing the television program in the real world can be replaced by the head movement with the HMD. In particular, the user's zapping on the virtual multi-display arranged in the virtual space can be achieved through only the movement of inclining the HMD without any remote-controller operation, and screen operability different from that in the real world can be provided to the user. Further, according to embodiments of the present description, the server aggregates the viewing data of each user viewing the broadcaster content in real time and feeds back the result to each user. Therefore, the user can know the popular broadcaster content in real time while viewing the broadcaster content.

The present description is not limited to the above-mentioned embodiments. A person skilled in the art would understand that various modifications can be made to the embodiments as long as the modifications do not deviate from the spirit and scope of the present description or the claims.

What is claimed is:

1. An apparatus for content viewing, the apparatus comprising:
    a display unit configured to display, on a head mounted display, a plurality of virtual displays arranged in a virtual space;
    a selecting unit configured to select one virtual display of the plurality of virtual displays based on a movement detected by a detector of the head mounted display; and
    a playing unit configured to play a content associated with the selected one virtual display,
    wherein the plurality of virtual displays are arrayed on grid sections arranged along a spherical surface, and
    wherein the selecting unit is configured to identify one of the grid sections on the spherical surface of a sphere based on the detected movement, to thereby select a virtual display of the plurality of virtual displays corresponding to the identified one of the grid sections, wherein
    the selected display is selected based on a maintaining of an inclination of the HMD for a predetermined time; further comprising:
    a determining unit configured to determine whether the content is continuously played for a given time period; and
    a content switching unit configured to switch the content being played with a content associated with a virtual display arranged at a predetermined position in response to a determination that the content is continuously played for the given time period.

2. The apparatus according to claim 1, further comprising a conditional playing unit configured to conditionally play simultaneously contents respectively associated with each virtual display of the plurality of virtual displays displayed on the head mounted display.

3. The apparatus according to claim 1, wherein the contents comprise television program contents receivable via a television receiver.

4. The apparatus according to claim 1,
    wherein the detector comprises an angular velocity sensor, and
    wherein the detected movement comprises an inclination.

5. A method to be used for content viewing, the method comprising:
    conditionally playing contents respectively associated with a plurality of virtual displays arranged in a virtual space;
    displaying, on a head mounted display, the plurality of virtual displays that are included in a field of view of the virtual space and respectively have the conditionally played contents;
    detecting a movement of the head mounted display;
    selecting one virtual display of the plurality of virtual displays depending on the movement;
    playing a content associated with the selected one virtual display;
    arranging in the virtual space the plurality of virtual displays on grid sections along a spherical surface, and
    identifying one of the grid sections based on the detected movement on the spherical surface of a sphere, and selecting a virtual display of the plurality of virtual displays corresponding to the identified one of the grid sections, wherein
    the selected display is selected based on a maintaining of an inclination of the HMD for a predetermined time; further comprising:
    determining whether the content is continuously played for a given time period in the playing a content; and
    switching the content being played with a content associated with a virtual display arranged at a predetermined position in response to a determination that the content is continuously played for the given time period.

6. A method according to claim 5, wherein the predetermined position in the virtual space comprises a center portion of the field of view.

7. A method according to claim 5, wherein the moving-image contents comprise television program contents receivable via a television receiver.

8. A non-transitory computer readable medium having stored thereon instructions for causing a computer to control a content viewing operation, the instructions for causing the computer to function as:
    a conditional playing unit configured to conditionally play contents respectively associated with a plurality of virtual displays arranged in a virtual space;
    a display unit configured to display, on a head mounted display, the plurality of virtual displays that are included in a field of view of the virtual space and respectively have the conditionally played contents;
    a selecting unit configured to select one virtual display of the plurality of virtual displays depending on a movement detected by a detector of the head mounted display;
    a playing unit configured to play a content associated with the selected one virtual display,
    arranging in the virtual space the plurality of virtual displays on grid sections along a spherical surface, and identifying one of the grid sections based on the detected movement on the spherical surface of a sphere, and selecting a virtual display of the plurality of virtual displays corresponding to the identified one of the grid sections, wherein the selected display is selected based on a maintaining of an inclination of the HMD for a predetermined time; wherein the instructions are for further causing the computer to function as:

a determining unit configured to determine whether the playing unit has continuously played the content for a given time period; and an arranging unit configured to switch the content being played with a content associated with a virtual display arranged at a center portion of the field of view in response to a determination that the content is continuously played for the given time period.

9. The non-transitory computer readable medium according to claim 8, wherein the instructions are for further causing the computer to function as the conditional playing unit configured to conditionally play television program contents receivable via a television receiver.

* * * * *